US006961663B2

(12) United States Patent
Sinclair et al.

(10) Patent No.: US 6,961,663 B2
(45) Date of Patent: *Nov. 1, 2005

(54) BOREHOLE COMPENSATION SYSTEM AND METHOD FOR A RESISTIVITY LOGGING TOOL

(75) Inventors: Paul L. Sinclair, Austin, TX (US); Tom Springer, Austin, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/895,613

(22) Filed: Jul. 20, 2004

(65) Prior Publication Data

US 2005/0046424 A1 Mar. 3, 2005

Related U.S. Application Data

(63) Continuation of application No. 10/293,708, filed on Nov. 13, 2002, now Pat. No. 6,765,385.
(60) Provisional application No. 60/350,590, filed on Nov. 13, 2001.

(51) Int. Cl.[7] ................................................. G01V 3/30
(52) U.S. Cl. ............................. 702/6; 702/7; 324/338; 324/339
(58) Field of Search ............. 702/6, 9, 7; 324/338–343; 166/250.2, 250.16

(56) References Cited

U.S. PATENT DOCUMENTS

| | | | |
|---|---|---|---|
| 2,608,602 A | 8/1952 | Muffly | |
| 3,328,679 A | 6/1967 | Sloughter | |
| 3,496,455 A | 2/1970 | Gouiloud | |
| 3,849,721 A | 11/1974 | Calvert | |
| 3,991,611 A | 11/1976 | Marshall, III et al. | |
| 4,968,940 A | 11/1990 | Clark et al. | |
| 5,065,099 A | 11/1991 | Sinclair et al. | |
| 5,402,068 A | * 3/1995 | Meador et al. | ............. 324/338 |
| 5,428,293 A | 6/1995 | Sinclair et al. | |
| 5,548,219 A | 8/1996 | Sinclair | |
| 5,594,343 A | 1/1997 | Clark et al. | |
| 5,594,344 A | 1/1997 | Doyle et al. | |
| 6,052,651 A | 4/2000 | Fournier | |
| 6,218,842 B1 | 4/2001 | Bittar et al. | |
| 6,501,276 B1 | 12/2002 | Bosnar | |
| 6,765,385 B2 | 7/2004 | Sinclair et al. | |

FOREIGN PATENT DOCUMENTS

EP 0 289 418 A2 11/1988

OTHER PUBLICATIONS

PCT Int'l Search Report dated Mar. 5, 2003, PCT/US02/36293.

* cited by examiner

*Primary Examiner*—Donald McElheny, Jr.
(74) *Attorney, Agent, or Firm*—Moser, Patterson & Sheridan

(57) ABSTRACT

System and method for borehole compensation. The method includes simultaneously transmitting at least two modulated signals from one or more transmitters; receiving the at least two modulated signals by at least one receiver; and processing the received at least two modulated signals to determine a phase difference and an amplitude attenuation of the transmitted modulated signals, the processing providing borehole compensated data.

20 Claims, 6 Drawing Sheets

BOREHOLE COMPENSATION SYSTEM AND METHOD FOR A RESISTIVITY LOGGING TOOL

CROSS-REFERENCE TO RELATED APPLICATIONS

This is a continuation of application U.S. Ser. No. 10/293,708 filed on Nov. 13, 2002 now U.S. Pat. No. 6,765,385. U.S. patent application Ser. No. 10/293,708 claims benefit of U.S. provisional application No. 60/350,590, filed Nov. 13, 2001. All of the above referenced U.S. patent applications are hereby incorporated by reference in their entireties.

BACKGROUND OF THE INVENTION

1. Field of the Invention

The present invention relates to measurement instruments, and, more particularly, to a method and apparatus for measuring borehole characteristics.

2. Description of the Related Art

Resistivity logging tools are instruments used in operations in boreholes that are drilled into underground rock formations in the search for oil, gas, or minerals. Resistivity logging tools measure the electrical conductivity of the rock formations accessible from the borehole, and more particularly, perform multiple simultaneous measurements while drilling, at each of several different radial distances from the axis of the borehole. Using the measurements taken by resistivity logging tools, a number of samples of rock resistivity can be combined into an image log as the tool progresses up the borehole. The image logs can make apparent variations or differences in rock resistivity due to invasion of the rock by drilling mud filtrate. Analysts can recognize valuable information about the constituents of the rock and other useful information, and automated software algorithms can also extract information about the amounts and producability of hydrocarbon deposits.

Existing tools for the purposes described above typically use the induction principle, with transmitting coils and receiving coils, at frequencies in the range of 200 KHz to 2 MHz. Although commonly referred to as "Wave Propagation Tools," the common reference is a misnomer because, at these frequencies, dimensions, and rock conductivities, the electromagnetic wave is in a degenerate mode dominated by skin effect. Measurements are commonly made of the phase-shift and attenuation of the signals at the receiver coils, which are indicative of the rock conductivity.

Maxwell's equations and known properties of the phenomenon of "skin-effect" in conductive media show that the phase and amplitude of an electromagnetic field established in a rock formation are altered by the properties and boundaries between differing regions of the rock in complex ways. A simple wave propagation resistivity tool includes a transmitter coil and a receiver coil. An electromagnetic field is created by current flowing in a transmitter coil placed coaxially in the borehole. The electromagnetic field propagates through the rock and is sensed by one or more receiver coils disposed coaxially with the transmitter coil, but spaced apart from the transmitter coil. Useful properties of the sensed signals include the phase and amplitude of the sinusoidal signals induced in the receiver coils.

The phase and amplitude differences of the voltages in adjacent receiver coils are representative of the components of the electromagnetic field coupled to the receiver coils after passing through the rock medium more distant from the borehole. Using the differences provides a compensation system for sensing the subtle variations in rock conductivity at a radial distance from the axis of the borehole. The actual distance measured typically depends on the transmitter-receiver spacing employed.

Often a borehole contains highly conductive mud, and the amount of the highly conductive mud increases in quantity when the diameter of a borehole increases after a washout of softer rock in the borehole. The increase in diameter can introduce errors in measurements due to additional local phase shift in, for example, one of the two receivers.

A useful technique to correct this problem is known as "Borehole Compensation," whereby at least two transmitter coils are used with each pair of receiving coils, the transmitters being positioned above and below the receivers and energized alternately. When the successive sets of data from receivers are combined, the effect of borehole diameter variations (and mismatched receiver circuits) is cancelled out.

The major problem with existing borehole compensation methods is the need to alternately energize two transmitters. Alternate energizing enables the task of measuring the two phase difference signals when the two transmitter coils operate at identical frequencies. However, using two transmitter coils alternately leads to errors in the form of incomplete compensation of borehole caving due to the time delay between sequential measurements, and the problem is amplified when a measurement tool is moving at high speed. Moreover, the incomplete compensation problem is compounded when there are multiple transmitters for different radial depths of investigation. For example, the multiple transmitter signals often need to be time-multiplexed when operating at the same frequency to avoid cross-talk. The problems caused by alternate energizing of coils leads to significant slowing of the rate of data acquisition. Further, the alternate energizing leads to errors in the form of incomplete compensation of borehole caving due to the time delay between sequential measurements and lowered signal to noise ratios due to the starting and stopping (i.e., duty cycle) of the transmitters. Errors are magnified by the time delays when drilling rates are high. Also, the multiplexing slows the rate of data acquisition.

The prior art provides for methods of acquiring data via measuring the attenuation of the amplitude of the waves. The amplitude is expressed as a logarithm of the received voltage signal, often expressed in units of decibels (dB), which has a particular use in gaining an understanding of rock resistivity. A description of these methods and of electronic circuits to perform one borehole compensation method are provided in U.S. Pat. No. 5,428,293 "Logging While Drilling Apparatus with Multiple Depth of Resistivity Investigation," to Paul L. Sinclair, and assigned to Halliburton Logging Services Inc. Although it has long been recognized that it would be most advantageous to be able to make simultaneous signal transmissions for borehole compensation, the problem of separating the upward and downward signals remains.

Therefore, there is a need for a borehole compensation method and system that avoids the requirement of alternately energizing transmitter coils and allows for faster rates of data acquisition.

SUMMARY OF THE INVENTION

Accordingly, embodiments of the present invention provide a system and a method for borehole compensation that allow simultaneous transmissions of modulated signals utilizing one or more transmitters and improves the rate of borehole data acquisition. The system and method advantageously maximize the signal to noise ratio by ensuring that the system continuously acquires data in each channel to the receiver.

One embodiment provides a method for borehole compensation comprising transmitting a plurality of signal frequencies, decoding the plurality of signal frequencies, and determining the phase difference of the original signal frequency in the plurality of receivers to measure borehole characteristics.

Another embodiment provides an apparatus for borehole compensation comprising: one or more transmitters configured to transmit at least two modulated signals simultaneously; one or more receivers configured to receive the at least two modulated signals; a demodulation circuit to demodulate the one or more modulated signals received; and a processing circuit configured to differentiate a phase difference signal and an amplitude attenuation signal from the at least two modulated signals which has been demodulated, the phase difference signal and the amplitude attenuation signals providing data for borehole compensation.

DETAILED DESCRIPTION OF THE PREFERRED EMBODIMENT

The following is intended to provide a detailed description of an example of the invention and should not be taken to be limiting of the invention itself. Rather, any number of variations may fall within the scope of the invention that is defined in the claims following the description.

Overview

Embodiments of the borehole compensation system and method employ a novel simultaneous multiplexing method employing frequency encoding. According to one embodiment, individual measurements are made at the same frequency, thereby avoiding errors due to different phase-shifts in the sensor coil and circuits that can be as significant as differences in the received signals due to borehole size variations. Another embodiment is directed to encoding a signal frequency $F_o$ in a plurality of methods that distinguish the signal frequency from another signal.

Structure and Methodology

One embodiment is directed to using amplitude modulation. More specifically, the embodiment uses the orthogonality of sines and cosines to permit transmitting and receiving the two different signals simultaneously on a same carrier frequency, as in quadrature multiplexing. Thus, signals transmitted are received by synchronous detection using carriers of a same frequency. In the embodiment, a second sinusoidal signal, is modulated at frequency $f_m$, and has the effect of creating upper and lower sideband signals at $(f_c+f_m)$ and $(f_c-f_m)$ respectively. According to design requirements, a modulating frequency can be several orders of magnitude lower than the signal frequency. Thus, the two sideband signals may be sufficiently close in frequency to be employed independently for the upper and lower transmitter coils without any detectable loss of accuracy.

For example, the carrier frequency $f_c$ may be 2 MHz and the modulating frequency $f_m$ may be 200 Hz. Thus, the two sidebands are at 2.0002 MHz and 1.9998 MHz respectively. In practice, the transmitter coils are each energized with respective single-sideband modulated signals (e.g., the upper sideband for the upper transmitter and the lower sideband for the lower transmitter) with the carrier frequency $f_c$ suppressed, and the two sidebands are separated in each of the two receiver circuits by selective demodulation.

Figure 1A:
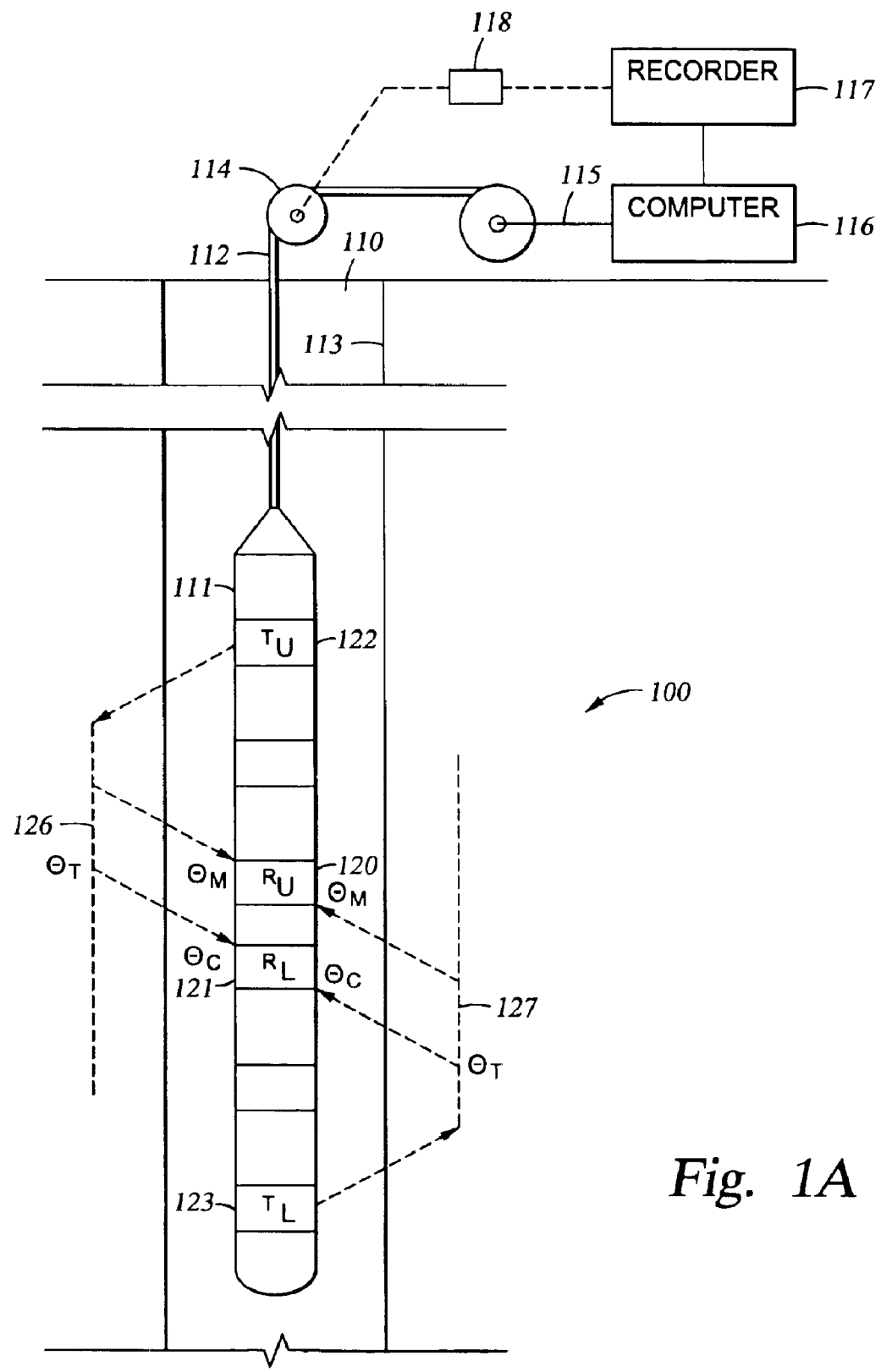
FIG. 1A illustrates a wireline tool within a borehole in accordance with the present invention.

Referring now to FIG. 1A, a sonde 100 illustrates a borehole compensation system described herein. More particularly, the sonde 100 is shown defined by a surrounding outer housing 111 and supported on a logging cable 112. Logging cable 112 enables retrieval of the sonde 100 as it is pulled upwardly in an open borehole, that is, a well that has been uncased. The borehole is identified by the numeral 113. The logging cable 112 passes over a sheave 114 and is stored in multiple turns on a drum 115. The sonde 100 may transmit data to data processing equipment 116 via either wireless transmissions or via wireline transmissions, and the data may be output to a recorder 117. The sheave 114 is connected with a mechanical or electrical depth measuring system 118 which provides measurements to the recorder 117 so that the data obtained from the logging sequence is recorded as a function of depth in the well borehole.

Figure 1B:
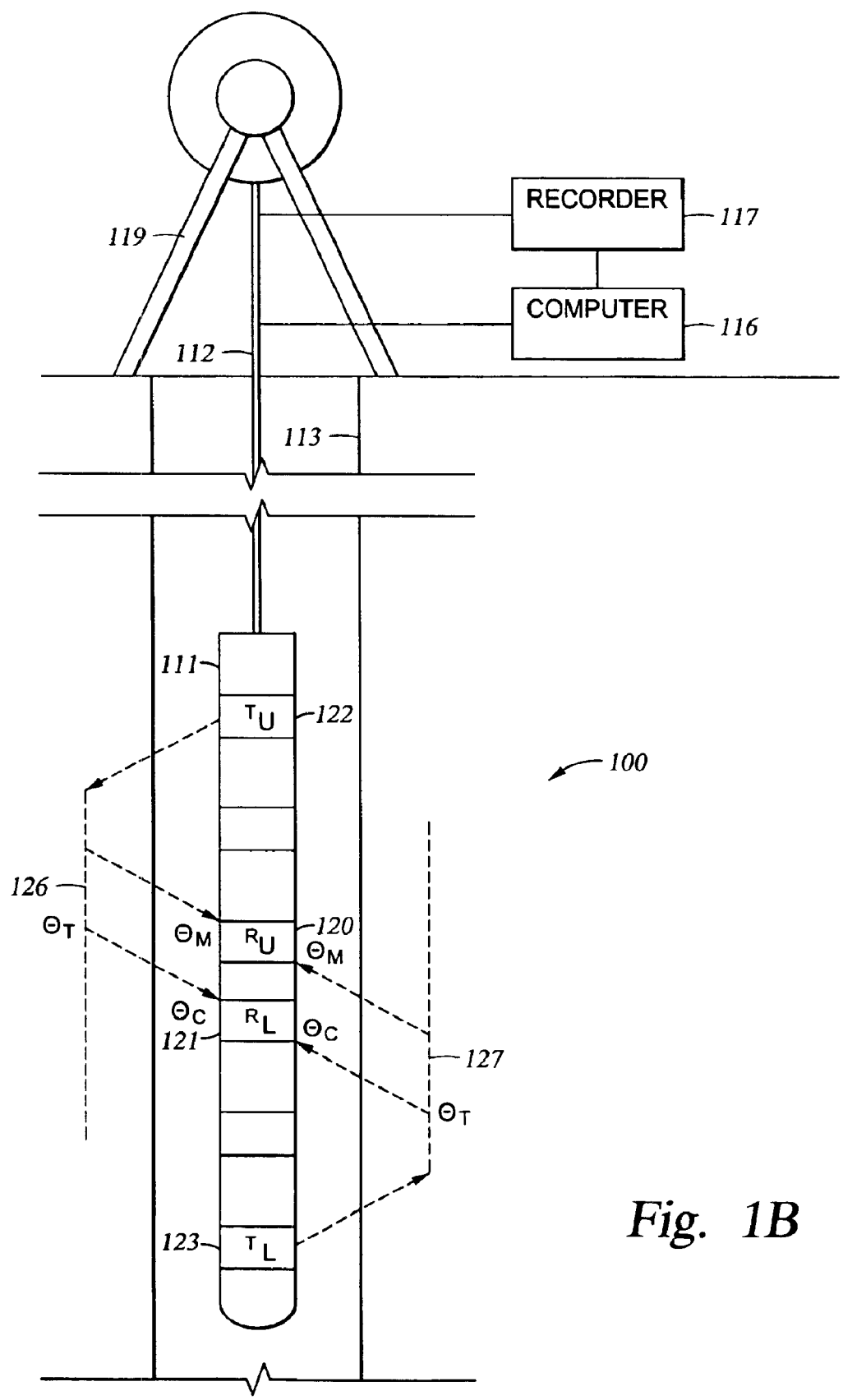
FIG. 1B illustrates a logging while drilling environment with a tool appropriate for implementing embodiments of the present invention.

Referring to FIG. 1B, the sonde 100 is shown in a non-wireline embodiment appropriate for measurement while drilling and logging while drilling applications. The sonde 100 is coupled to a drilling rig 119, which is coupled to data processing equipment 116. The drilling rig 119 includes wireless transmission and reception equipment (not shown) appropriate for transmitting data to data processing equipment 116 that can be output to a recorder 117.

Referring to FIGS. 1A and 1B, the sonde 100 includes two receiving antennas, also referred herein as receivers, and two transmitting antennas, also referred herein as transmitters. All antennas may be constructed in the same fashion and have the form of solenoid coils supported on a mandrel common to all the antennas. One embodiment includes an upper receiver $R_U$ 120, a lower receiver $R_L$ 121, an upper transmitter $T_U$ 122 and a lower transmitter $T_L$ 123. The receivers 120 and 121 are spaced from one another and define a mid-point between the two receivers, which is the symmetrical mid-point between the upper transmitter/receiver combination and the lower transmitter/receiver combination. The receiver $R_U$ 120 and transmitter $T_U$ 122 positioned above the mid-point provide a mirror image to the receiver $R_L$ 121 and transmitter $T_L$ 123 disposed below the mid-point. The receivers 120 and 121 are substantially equally spaced from the mid-point. In one embodiment, each receiver is five inches from the mid-point, or a total span of 10 inches is between the receivers 120 and 121.

As will be understood, FIGS. 1A and 1B show an idealized representation of a borehole for which sidewalls defined by the borehole may be irregular. In practice, there are irregularities in the sidewall, and it is therefore desirable to incorporate a dual transmission system to reduce the errors resulting from irregularities in sidewall shape.

Ray path 126 involves transmission from the transmitter coil 122. The path is ideally represented as extending downwardly from that coil along the path 126 so that the transmitted signal is received at both receiver coils or 120 and 121. The path from the lowermost transmitter coil 123 is upwardly and parallel to the borehole in like fashion. The two radiation paths provide signals to the spaced receivers. Importantly, the ray paths 126 and 127 are through a formation to be tested and measured.

Sonde 100 is shown with two transmitter coils and at least two receiving coils, the transmitter coils are positioned above and below the two receivers. An upper transmitter coil 122 generates an electromagnetic field that propagates into the rock formation. One component of the electromagnetic field 126 travels downward past receiver coils 120 and 121.

In the portion of the rock adjacent to the receivers, the wave experiences a phase shift characteristic of the rock indicated at $\Theta_T$, and components of this wave pass through the borehole wall to the receivers. That component arriving at and detected by receiver 120 experiences an additional phase shift indicated as $\Theta_M$, and the portion similarly detected by receiver 121 experiences a different additional phase shift $\Theta_C$ due to a difference in borehole diameter (e.g. a "cave") at that receiver coil location.

A measurement of the phase difference between the two receiver signals yields the following:

Phase Difference #1=$\Theta_T$+$\Theta_C$-$\Theta_M$

Lower transmitter coil 123 has a component of its electromagnetic field 127 that travels upward toward the receiver coils 120 and 121. In a similar analysis to the preceding case, a second measured phase difference (switching the order of the two receivers) is:

Phase Difference #2=$\Theta_T$-$\Theta_C$+$\Theta_M$

Numerically adding the two phase-difference measurements gives the result as twice the true phase shift indicative of the rock properties, uncontaminated by the borehole phase-shift components:

Phase Difference #1+Phase Difference #2=2·$\Theta_T$

The doubling of the phase data improves signal/noise ratio and can be taken into account in interpreting the phase data in terms of rock resistivity. For illustrative purposes only, the wave components shown in FIG. 1 are split on the left and right sides of the borehole, whereas in reality the components of the wave fill the volume of rock uniformly around the borehole.

A method according to an embodiment solves the time-delay problems of the prior art by employing a simultaneous multiplexing method employing frequency encoding, and circuitry is described below. In one embodiment, individual signal transmissions at near-identical frequencies (e.g., difference less than 1000 Hz) are utilized because the rock formation phase-shift and attenuation are frequency-dependent. At the frequencies commonly employed in a downhole drilling tools, and in the range of rock resistivity encountered, the phase-shift varies approximately with the square root of resistivity.

In the method to be described, one embodiment is directed to synthesizing two frequencies for use by the upper and lower transmitters simultaneously, wherein the two frequencies are closely spaced. For example, $F_U$ (for the upper transmitter) may be 2.0001 MHz and $F_L$ (for the lower transmitter) may be 1.9999 MHz. If a square-root relationship is assumed, the ratio of the apparent phase-shifts measured from the upper and lower transmitters at a given rock resistivity apply to estimate the error due to frequency difference:

$$\Theta_U/\Theta_L = (F_U/F_R)^{1/2} = (2.0001/1.9999)^{1/2} = 1.00005$$

The error is only 0.005% of the actual phase value, which is insignificant when compared to other errors arising from other measurement techniques. For attenuation data, a similar analysis provides similar results. As will be understood by those of skill in the art with the benefit of the present disclosure, the values provided are from one embodiment of a dual-transmitter borehole compensation method.

In another embodiment, a simple borehole compensation employs a single transmitter coil and two receiver coils. In this embodiment, the receiver coils and their associated signal processing circuits have identical gain and phase characteristics. Having identical gain and phase characteristics prevents the acquired data from having a built-in bias in the measured attenuation and phase-shift.

Referring back to FIG. 1, for one embodiment of the borehole compensation method the phase-shifts introduced by the borehole ($\Theta_C$ and $\Theta_M$) can, by extension, be considered to include the additional phase-shifts introduced by the coils and associated electronic measurement circuits. Thus, one embodiment of a method also compensates for mismatches in the entire receiver signal path, since it is particularly difficult to match, for example, two high-frequency coil antennas that are exposed to downhole pressure and temperature extremes.

Mismatch in receiver and transmitter coils and circuits typically approach several degrees in phase angle, and several tenths of a decibel in gain, when operated at the same frequency. These values may be compared with the smallest measured data, which are typically 1 degree and 5 decibels in a rock resistivity of 200 ohm-meters, which represents the upper useful limit of resistivity range of these types of tools. If the two transmitter coils are operated at slightly different frequencies, as described in an embodiment, there is a risk that the compensation scheme will not work due to the phase and gain differences in the two receiver signal channels at different frequencies. Moreover, if the receiver circuits include filters tuned to one center frequency to maximize signal/noise ratio, the phase and gain differences are amplified. A system using receiver circuits with filters tuned to one center frequency is known, but such a system typically has a low "Q-factor" due to the risk of large temperature-induced shifts. As a worst case example, the magnitude of the phase error can be estimated in a tuned circuit with a Q=1 tuned to a resonant frequency $F_R$—2.0000 MHz, when frequencies $F_U$—2.0001 MHz and $F_L$—1.9999 MHz:

$$\text{Phase error} = \arctangent\{Q\cdot[(F_U/F_R) - 1]\} -$$
$$\arctangent\{Q\cdot[(F_L/F_R) - 1]\}$$
$$= 0.006 \text{ degrees}$$

The above parameters introduce a worse case error in the phase signal from 200 Ohm-meter rock of about 0.6%, which when interpreted as an apparent rock resistivity would give an error of 1.2%. The error will be correspondingly smaller when the tool is adjacent to more conductive rocks, where larger phase-shift signals are recorded. Such an error is typically quite acceptable for the purpose of rock formation analysis, particularly since it is a constant error that may be removed by calibration methods. A similar analysis for attenuation data shows similar acceptable error values.

Turning now to the system employed to generate and detect two closely spaced frequencies, several methods are available. A first method uses a Single-SideBand/Suppressed-Carrier (SSB/SC) method that has been employed in short-wave radio communication systems.

Figure 2:
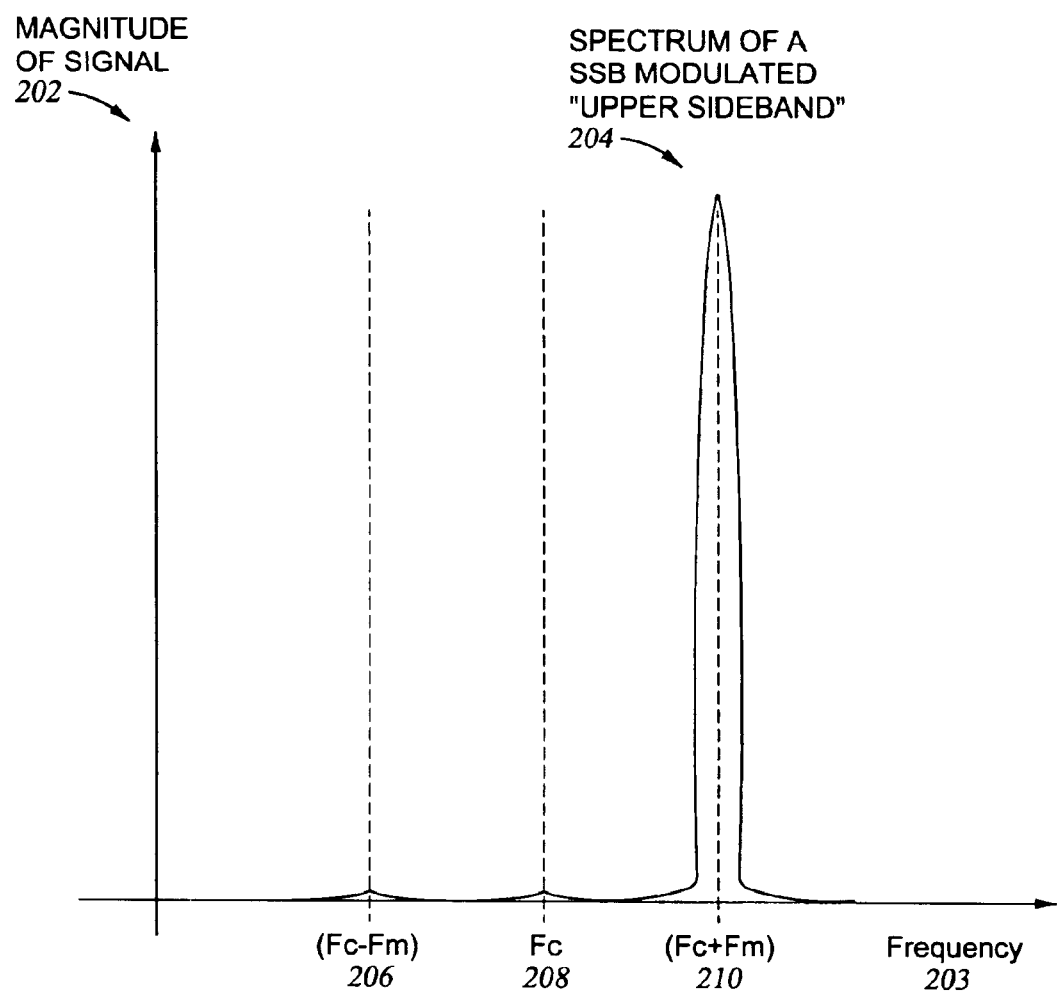
FIG. 2 is a graph of a signal in accordance with the present invention.

Referring now to FIG. 2, a graph illustrates a frequency spectrum. FIG. 2 shows a y axis 202 representing the magnitude of signals, and an x axis 203 representing the frequency of signals. The spectrum of a SSB modulated "upper sideband" signal 204 is shown relative to the modulation system. More particularly, FIG. 2 includes a sinusoidal "carrier frequency" $F_C$ 208 that is amplitude-modulated by a sinusoidal "modulation frequency" $F_M$, potentially producing two side-band frequency components $(F_C+F_M)$ 210 and $(F_C-F_M)$ 206. In one example, $F_C$ 208 is 2.0000 MHz and $F_M$ is 100 Hz, then the sidebands 210 and 206 are at 2.0001 MHz and 1.9999 MHZ respectively. Thus, the spectrum shown in FIG. 2 illustrates the output from a Single-Sideband Modulator with a suppressed carrier. Modulators of this type may be constructed using two mixers each with an $F_M$ input and $F_C$ input, with a $F_C$ signal split into two quadrature components that are supplied to the mixers.

Combining circuits that add or subtract the two mixer outputs, in one embodiment, the system substantially separates the two sidebands 210 and 206 and eliminates the carrier frequency component, providing two pure sideband frequency signals that may be used to energize the upper and lower transmitter coils simultaneously.

After signal detection in the receiver coils and subsequent signal amplification, demodulation of the sideband signals into their separate components is performed using SSB/SC demodulator circuits. A demodulator appropriate for one or more embodiments herein includes phase-quadrature missing circuits supplied with quadrature components of the input signal, wherein the sum or difference of the quadrature mixer outputs provide upper or lower sideband outputs respectively. According to one embodiment, a SSB demodulator is employed in each of two receiver channels and configured to separate the signal components from each of the two transmitter coils simultaneously. Two outputs at 100 Hz, representing the upward and downward signal transmission are provided from each receiver. The output signals are then input to phase-sensitive measurement circuits to determine the phase difference between receiver coil signals from each transmitter simultaneously, and provide a digital representation. Additional electronic circuits may measure and compare the amplitude of each received signal with high resolution, for use in determining the wave attenuation in the formation. Other circuits transmit this data to processing, recording, and display equipment at the surface of the earth.

An alternate method of synthesizing closely spaced frequencies with high precision is described in U.S. Pat. No. 5,548,219, entitled "Digital Two-Frequency Generator for use in Borehole Heterodyne Measurement Systems," to Paul L. Sinclair. The method therein described employs high-speed Read-Only-Memory (ROM) semiconductor devices that contain stored sequential numerical samples of sinusoidal signals. Using a quartz-crystal oscillator and binary counter circuits to repeatedly sequence all the addresses of the ROM, the stream of output data may be fed to a Digital-to-Analog converter (DAC) that in turn outputs the synthesized sinusoidal signal. The successive numerical samples are computed for many cycles of a frequency that is an odd-order sub-harmonic of the oscillator frequency. The odd-order sub-harmonic makes it possible to generate a frequency that, in combination with an even-order sub-harmonic (such as one of the ROM addressing frequencies provided by the counter), results in two closely spaced phase-locked frequency signals. The method may be extended and improved to provide additional frequencies that may be employed in the demodulation process in the system described herein. The advantages of using circuit methods based on digital circuits include greater accuracy, simplicity, and temperature stability.

Yet another synthesis method appropriate for an embodiment employs fractional-N Phase-Locked-Loop (PLL) circuits that are known in communication systems to generate signals at closely spaced frequencies under control of a binary digital input. Several of these PLL circuits are employed to generate transmitter signals and receiver demodulation reference signals, all phase-locked to a single crystal oscillator. In general, these methods are complex to implement and do not provide the lowest phase noise levels due to the use of Voltage Controlled Oscillators, particularly in the high temperature environment of borehole operations.

A fourth synthesis method according to an embodiment uses ROM devices containing samples of harmonically related sinusoidal signals, but different from the methods claimed in the U.S. Pat. No. 5,548,219 described above. In this embodiment, a plurality of ROM devices are connected to a single oscillator and binary counter chain, each ROM containing stored samples of the harmonically related $F_U$ and $F_L$ frequencies equally separated from a carrier frequency $F_C$. The circuit also generates two other signals $F_{CI}$ and $F_{CQ}$ that are the in-phase and quadrature components of the $F_C$ frequency for use in the demodulation process in the receiver circuits. The circuit is a digital component version of a SSB/SC communication method, applied to the special needs of a MWD borehole measurement system.

Figure 3A:
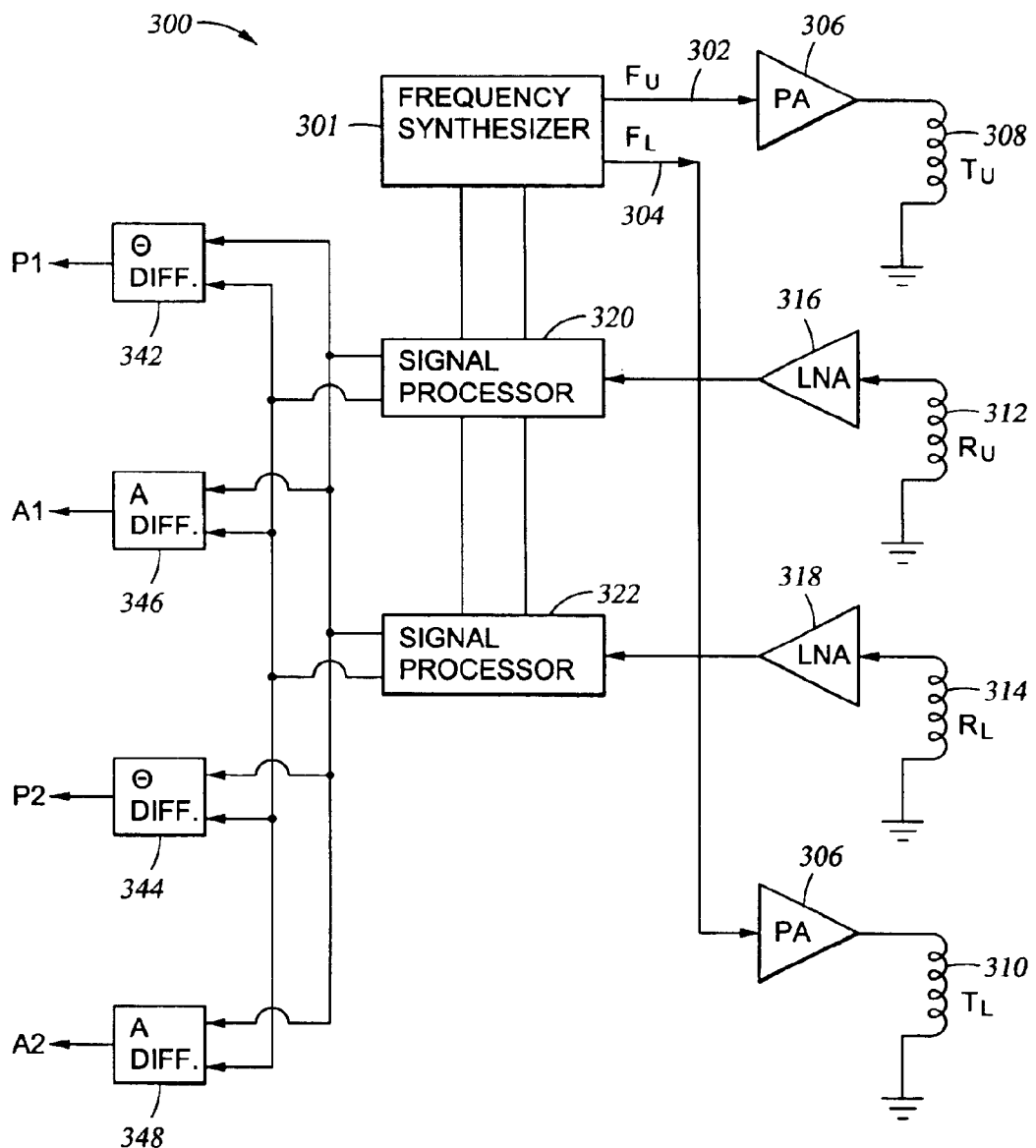
FIGS. 3A and 3B illustrate a system for borehole compensation according to one embodiment of the present invention.

Referring now to FIG. 3A, a measurement system 300 is shown that performs simultaneous transmission from upper and lower transmitting coils, separation of the received components of the signals, and measurement of the phase and attenuation information in the signals. A Frequency Synthesizer circuit 301 generates $F_U$ 302 and $F_L$ 304 frequencies, which are supplied to power amplifiers (PA) 306 and then to the upper and lower transmitter coils ($T_U$ and $T_L$) 308 and 310, respectively. In one embodiment, the frequencies $F_U$ 302 and $F_L$ 304 represent the $(F_C+F_M)$ and $F_C-F_M$) individual sidebands, generated using SSB/SC modulators. The upper and lower receiver coils ($R_U$ and $R_L$) 312 and 314, respectively, are generally disposed coaxially and substantially equally spaced between the two transmitters 308 and 310. The transmitter coils 308, 310 and the receiver coils 312, 314 represent one embodiment of the transmitters and receivers illustrated above in FIGS. 1A and 1B. Each of the outputs from receiver coils ($R_U$ and $R_L$) 312 and 314 are coupled to a signal voltage to Low-Noise Amplifiers (LNA) 316 and 318, respectively for amplification to a level sufficient for the signal processors 320 and 322.

Figure 3B:
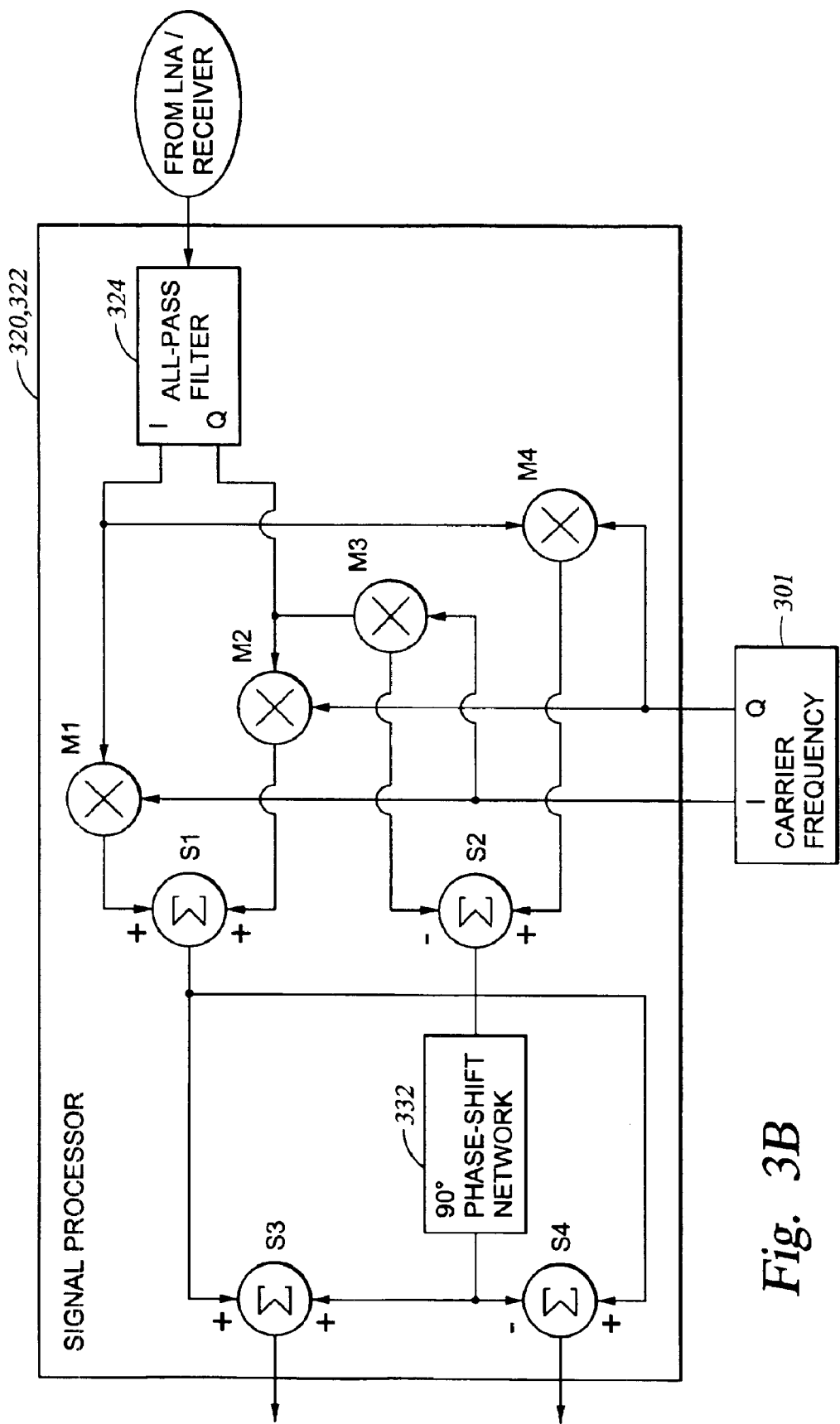

FIG. 3B illustrates one embodiment of a signal processor (which is representative of each signal processor 320, 322). Each amplified output signal from the receivers 312 and 314 is processed through respective signal processors 320 and 322. The amplified output signal is separated into in-phase and quadrature components through the All-Pass Filter 324. The All-Pass filter or network 324 exhibits a constant gain over a wide frequency range, but outputs two signals (an in-phase signal I and a quadrature signal Q). The in-phase and quadrature outputs (labeled "I" and "Q" respectively) are input to two pairs of mixer circuits M1/M2 and M3/M4 whose function is to perform a multiplication process on the input signals with the in-phase and quadrature signals, $F_{CI}$ and $F_{CQ}$ respectively, from the reference signals. The in-phase and quadrature components of the carrier frequency ($F_C$), typically 2.0000 MHz, are also generated by the Frequency Synthesizer 301.

The process of demodulation of the received signals is complete when the outputs of the mixers are input to summing networks S1 and S2 that form the sum and difference of the outputs from the mixer circuits M1–M4. The summing networks and the mixer circuits may be constructed using operational amplifiers. The outputs of the summing networks S1 and S2 are signals at the $F_M$ frequency (typically 100 Hz) that are phase-shifted by the same amount in degrees as the signals $F_U$ 302 and $F_L$ 304 experience in passing from transmitter coil to receiver coil through the rock formation. The outputs of the summing networks S1 and S2 are then passed through summing networks S3 and S4 to recover the original modulating signal from the upper sideband and the lower sideband, respectively. The outputs of the summing networks S3 and S4 are the outputs of the signal processors 320, 322.

Referring back to FIG. 3A, differentiator circuits (342, 344, 346, and 348) that detect the phase difference (Θ-diff) and Attenuation (A-diff) take their corresponding signal inputs from the upper and lower signal processors 320, 322, and produce the output of the phase data P1 and P2, respectively, and the attenuation data A1 and A2, respectively, from the upward and downward wave propagation respectively. In the last stage of signal processing, subtraction of P2 from P1, and A2 from A1, results in fully borehole-compensated data.

One embodiment provides a borehole compensation system which simultaneously transmits upper and lower single sidebands of an amplitude-modulated carrier signal during the resistivity measurement. The process can be described mathematically as follows. In one embodiment, the carrier frequency fc is 2 MHz while the modulating frequency fm is 100 Hz. Because the sidebands are very close in frequency, the accuracy of the resistivity measurement is not impaired by the frequency-dependent characteristics of the rock or formation.

The upper side band (at a frequency ($f_c+f_m$)) drives the upper transmitter 308 while the lower sideband (at a frequency ($f_c-f_m$)) drives the lower transmitting antenna 310. Both signals are received by each receiver 312, 314 and are subject to signal processing through the processors 320, 322. At each receiving antenna, the sidebands are demodulated to recover to recover the modulating signal, and separated into two distinct signals corresponding to the signals transmitted by the upper and lower transmitters.

The amplitude and phase of the signals received by the receiving antenna is a function of the characteristics of the local rock formation, along with other factors, such as borehole geometry and intrinsic losses and phase shift within the electronics. Dual transmitter borehole compensation reduces or minimizes the influence of these other factors.

After amplification by the low noise amplifier 316, 318, the received signals are processed by an all pass filter 324. The all pass filter provides an in-phase output I and a quadrature output Q, through which two versions of the received signal appear. Both outputs (I and Q) have the same amplitude, but have a relative phase angle of 90 degrees. The signals received from the lower transmitting antenna $T_L$ have the opposite polarity of the signals received from the upper transmitting antenna $T_L$. Thus, in the following expressions representing the sidebands, the lower sideband terms are negative.

The in-phase upper sideband from the I output of the all pass filter is represented by the following function:

$$F_{UI}(t)=A_U \sin [2\pi(f_c+f_m)t+\theta_U]$$

The in-phase lower sideband from the I output of the all pass filter is represented by the following function:

$$F_{LI}(t)=-A_U \sin [2\pi(f_c-f_m)t+\theta_L]$$

The quadrature upper sideband from the Q output of the all pass filter is represented by the following function:

$$F_{UQ}(t)=A_U \cos [2\pi(f_c+f_m)t+\theta_U]$$

The quadrature lower sideband from the Q output of the all pass filter is represented by the following function:

$$F_{LQ}(t)=-A_L \cos [2\pi(f_c-f_m)t+\theta_L]$$

The in-phase and quadrature versions of the original carrier signal at a frequency are utilized to demodulate the in-phase and quadrature outputs of the all-pass filter. The in-phase carrier signal I is represented by the following function:

$$F_{CI}(t)=\sin(2\pi f_c t)$$

The quadrature carrier signal Q is represented by the following function:

$$F_{CQ}(t)=\cos(2\pi f_c t)$$

Typically, a carrier frequency is about 2 MHz. The modulating frequency is selected as 100 Hz. For illustrative purposes in the example, a carrier frequency of 1000 Hz is utilized to simplify the Fourier analysis. The modulating signal is represented by the following equation:

$$F_M(t)=\sin [2\pi f_m t]$$

Two pairs of mixers (M1/M2 and M3/M4) are utilized to generate the four possible products of in-phase and quadrature carrier signals with the in-phase and quadrature sideband signals. The sum S1 of the outputs of M1 and M2 as well as the difference S2 of the outputs of M3 and M4 are demodulated to yield two distinct signals at the original modulating frequency $f_m$. Each demodulated signal is associated with either the upper or lower transmitting antenna (i.e., the upper or lower sideband frequency, ($f_c+f_m$) or ($f_c-f_m$).

The mixer M1 multiplies the in-phase sideband signals from the I output of the all-pass filter with the in-phase carrier signal as represented by the following function.

$$M1(t)=[A_U \sin [2\pi(f_c+f_m)t+\theta_U]-A_L \sin [2\pi(f_c-f_m)t+\theta_L]] \sin(2\pi f_c t)$$

The mixer M2 multiplies the quadrature sideband signals from the Q output of the all-pass filter with the quadrature carrier signal as represented by the following function.

$$M2(t)=[A_U \cos [2\pi(f_c+f_m)t+\theta_U]-A_L \cos [2\pi(f_c-f_m)t+\theta_L]] \cos(2\pi f_c t)$$

The mixer M3 multiplies the quadrature sideband signals from the Q output of the all-pass filter with the in-phase carrier signal as represented by the following function.

$$M3(t)=[A_U \cos [2\pi(f_c+f_m)t+\theta_U]-A_L \cos [2\pi(f_c-f_m)t+\theta_L]] \sin(2\pi f_c t)$$

The mixer M2 multiplies the in-phase sideband signals from the Q output of the all-pass filter with the quadrature carrier signal as represented by the following function.

$$M4(t)=[A_U \sin [2\pi(f_c+f_m)t+\theta_U]-A_L \sin [2\pi(f_c-f_m)t+\theta_L]] \cos(2\pi f_c t)$$

The following trigonometric identities are utilized to compute the products M1–M4.

$$\sin(A)\sin(B)=\tfrac{1}{2}\cos(A-B)-\tfrac{1}{2}\cos(A+B)$$

$$\cos(A)\cos(B)=\tfrac{1}{2}\cos(A-B)+\tfrac{1}{2}\cos(A+B)$$

$$\sin(A)\cos(B)=\tfrac{1}{2}\sin(A+B)+\tfrac{1}{2}\cos(A-B)$$

$$\cos(A)\sin(B)=\tfrac{1}{2}\sin(A+B)-\tfrac{1}{2}\cos(A-B)$$

Accordingly, the outputs of mixers M1 and M2 can be expressed as follows:

$$M1(t)=0.5A_U[\cos(2\pi f_m t+\theta_U)-\cos[2\pi(2f_c+f_m)t+\theta_U]]-0.5A_L[\cos(-2\pi f_m t+\theta_L)-\cos[2\pi(2f_c-f_m)t+\theta_L]]$$

$$M2(t)=0.5A_U[\cos(2\pi f_m t+\theta_U)+\cos[2\pi(2f_c+f_m)t+\theta_U]]-0.5A_L[\cos(-2\pi f_m t+\theta_L)+\cos[2\pi(2f_c-f_m)t+\theta_L]]$$

The summing network S1 adds the outputs of mixers M1 and M2, yielding the following demodulated output:

$$S1(t)=A_U \cos(2\pi f_m t+\theta_U)-A_L \cos(2\pi f_m t-\theta_L)$$

The output of the summing network S1 contains only the original modulating frequency. Any higher frequency components are absent from the output of S1. Also, the phase angles of the original upper and lower sidebands, $\Theta_U$ and $\Theta_L$, are preserved in the demodulated signals present at the output of S1.

The outputs of mixers M3 and M4 can be expressed as follows:

$$M3(t)=0.5A_U[\sin[2\pi(2f_c+f_m)t+\theta_U]-\sin(2\pi f_m t+\theta_U)]-0.5A_L[\sin[2\pi(2f_c-f_m)t+\theta_L]-\sin(-2\pi f_m t+\theta_L)]$$

$$M4(t)=0.5A_U[\sin[2\pi(2f_c+f_m)t+\theta_U]+\sin(2\pi f_m t+\theta_U)]-0.5A_L[\sin[2\pi(2f_c-f_m)t+\theta_L]+\sin(-2\pi f_m t+\theta_L)]$$

The summing network S2 subtracts the output of mixer M3 from the output of mixer M4, yielding the following demodulated output:

$$S2(t)=A_U \sin(2\pi f_m t+\theta_U)+A_L \sin(2\pi f_m t-\theta_L)$$

The output of S2 can easily be phase-shifted 90 degrees by a simple 90 phase shift network 332, as represented by the following equation:

$$S2_{90}(t)=A_U \cos(2\pi f_m t+\theta_U)+A_L \cos(2\pi f_m t-\theta_L)$$

The summing network S3 adds the phase-shifted output of S2 with the output of S1 to produce:

$$S3(t)=2A_U \cos(2\pi f_m t+\theta_U)$$

The summing network S4 subtracts the phase-shifted output of S2 from the output of S1 to produce:

$$S4(t)=-2A_L \cos(2\pi f_m t-\theta_L)$$

The output of summing network S3 provides the modulating signal recovered from the upper sideband, corresponding to the signal path of the upper transmitting antenna. Conversely, the output of summing network. S4 provides the modulating signal recovered from the lower sideband, corresponding to the signal path of the lower transmitting antenna. Thus, the signal processor and the signal processing operations may be utilized to distinguish the simultaneously transmitted upper and lower sidebands and to discriminate between the phase shifts associated with the upper and lower signal paths (i.e., $\theta_U$ and $\theta_L$ respectively). A phase shift measurement can be performed on S3(t) and S4(t) relative to a reference signal such as $F_M$(t).

A similar analysis may be performed for the lower receiver. The phase angles for the upper and lower signal paths may be obtained for each of the receiving antennas, and the difference between the phase shifts may be computed. The difference in phase shift depends only on the characteristics of the rock surrounding the borehole in the region between RU and RL, and is not influenced by cavities in the borehole. Thus, borehole compensation is accomplished through simultaneous transmission and reception of upper and lower signals.

Figure 5:
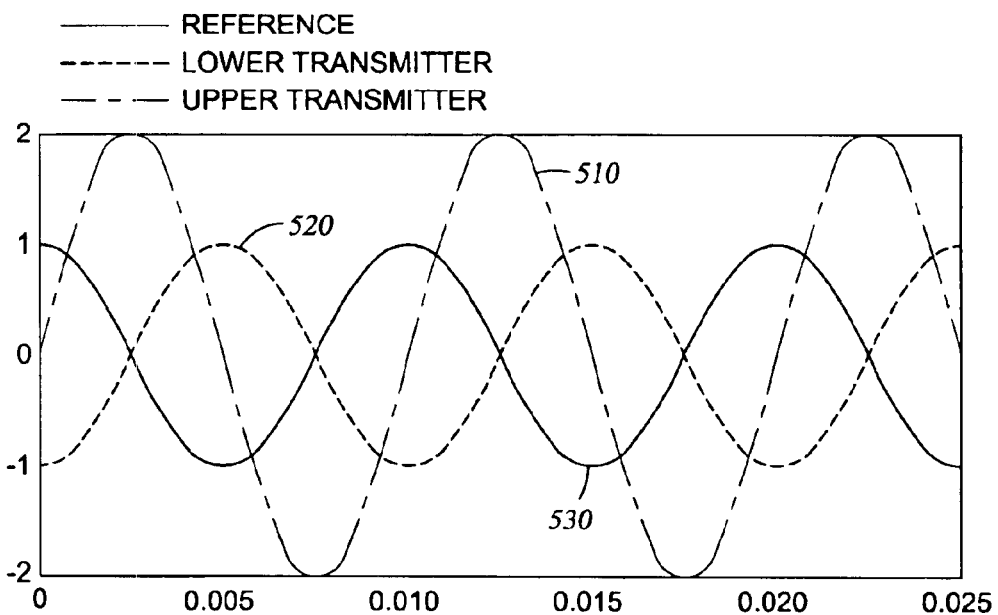
FIG. 5 is a graphical illustration of a mathematical simulation of one embodiment of the present invention.

FIG. 5 is a graphical illustration of a mathematical simulation performed to check the validity of the borehole compensation method according to one embodiment of the invention. The output signals 510 and 520 of the summing networks S3 and S4, respectively, are plotted against the reference signal 530, $\cos(2\pi f_m t)$. For this example, the sample rate fs is 10000; the sample interval $\Delta t$ is equal to 1/fs; the number of samples N equals 4096; the amplitude and phase shift of the upper sideband are set to AU=1.0 and $\Theta U=-0.5\pi$, the amplitude and phase shift of the lower sideband are set to AL=0.5 and $\Theta L=-\pi$.

As illustrated in FIG. 5, the signal output from S4 is inverted, since it is a negative quantity. The signal recovered from the upper transmitter lags the reference waveform by a phase angle of $0.5\pi$ while the signal recovered from the lower transmitter lags the reference by a phase angle of $\pi$. Furthermore, the waveform corresponding to the upper transmitter has twice the amplitude of the waveform corresponding to the lower transmitter. Thus, this simulation confirms the validity of the borehole compensation method according to embodiments of the invention.

It will be obvious to those skilled in the art that it is possible to digitize the received signals using a high-speed A/D converter, and supply the digitized samples of received waveforms to a Digital Signal Processor (DSP) circuit. All of the demodulation and phase/attenuation signal processing methods described herein may then be implemented as software routines executed in real-time in the DSP, providing substantially the same overall results with fewer components than the analog circuit design described. This would be an alternate implementation of the invention, and within the scope of this disclosure.

Another method of modulation that may be used is to choose the same $F_O$ frequency but two different $F_M$ frequencies for the two transmitters. The upper transmitter may use a 200 Hz modulation and the lower transmitter a 400 Hz modulation. In the receiver circuits, a synchronous detector employing a local oscillator at the $F_O$ frequency will output signals at 200 Hz and 400 Hz that may easily be separated by filtering methods. Yet another variation of this method is to modulate the transmitter frequencies by two different binary digital codes, allowing separation in the receiver circuits using digital cross-correlation methods, or by purely software algorithms.

After demodulation, phase detectors are used to determine the phase difference between receiver coil signals from each transmitter simultaneously, and provide a digital representation. Additional electronic circuits may measure the amplitude of each received signal with high resolution, for use in determining the wave attenuation in the formation. Other circuits transmit this data to processing, recording, and display equipment at the surface of the earth.

Figure 4:
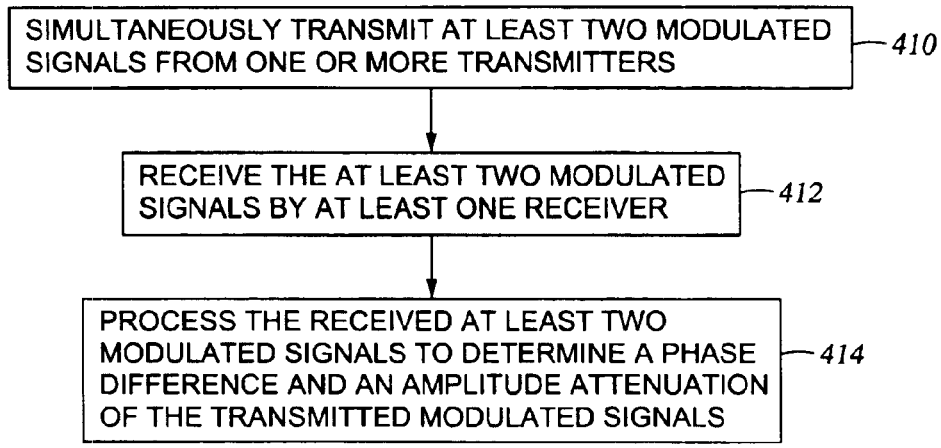
FIG. 4 is a flow diagram illustrating a method for borehole compensation according to one embodiment of the present invention.

Referring now to FIG. 4, a method according to an embodiment is provided in a flow diagram. More particularly, block 410 provides for simultaneously transmitting at least two modulated signals from one or more transmitters. Block 412 provides for receiving the at least two modulated signals by at least one receiver. Block 414 provides for processing the received at least two modulated signals to determine the phase difference and an amplitude attenuation of the transmitted modulated signals, the processing providing borehole compensated data. More specifically, the at least two modulated signals can be related such that the signals are modulated with a same carrier frequency. The relatedness and the modulation frequencies chosen allow separation of phase components using the methods, such as SSB/SC described herein. Accordingly, operating two or more transmitters simultaneously is possible independent of data corruption.

The processing includes demodulating the received modulated signals and differentiating at least one component of the demodulated signals to determine the phase difference and the amplitude attenuation of the transmitted modulated signals. For example, a component can be either or both of a phase component and an amplitude component. Further, processing, in one embodiment, includes filtering the received modulated signals. As discussed above, the modulated signals can be single side band modulated signals, double side band modulated signals, or suppressed carrier modulated signals. In one embodiment, the single side band modulation method avoids a need for a precisely selective receiver filter to differentiate the phase components and amplitude components of the received modulated signals. However, one with skill in the art with the benefit of the disclosure appreciates that the type of modulation can include pulse-amplitude modulation, code division modulation, quadrature amplitude modulation or phase-shift keying.

In another embodiment, the method includes transmitting at least two modulated signals from two or more transmitters, simultaneously receiving the at least two modulated signals by at least one receiver, and processing the simultaneously received at least two modulated signals to determine a phase difference and an amplitude attenuation of the transmitted modulated signals, the processing providing borehole compensated data. In this embodiment, the simultaneously receiving permits continuous data acquisition. The continuous data acquisition provides an increased signal to noise ratio as compared to a sequential data acquisition.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable gate array (FPGA), the design of a gate array or full-custom application-specific integrated circuit (ASIC), or the like.

Each of the blocks of the flow diagram may be executed by a module (e.g., a software module) or a portion of a module or a computer system user using, for example, a computer system such as the storage router previously mentioned, or a similar network element, as well as a computer system. Thus, the above described method, the operations thereof and modules therefore may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit that is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media, optical storage media such as compact disk media (e.g., CD-ROM, CD-R, etc.) and digital video disk storage media, nonvolatile memory storage memory including semiconductor-based memory units such as FLASH memory, EEPROM, EPROM, ROM or application specific integrated circuits. Volatile storage media including registers, buffers or caches, main memory, RAM, etc. and data transmission media including computer network, point-to-point telecommunication, and carrier wave transmission media. In a UNIX-based embodiment, the software modules may be embodied in a file that may be a device, a terminal, a local or remote file, a socket, a network connection, a signal, or other expedient of communication or state change. Other new and various typed of computer-readable media may be used to store and/or transmit the software modules discussed herein.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

What is claimed is:

1. A method of compensating for the effect of borehole variations, comprising:
   transmitting at least two modulated signals from within the borehole;
   receiving from within the borehole the at least two modulated signals; and
   processing the at least two modulated signals received to determine a phase difference of the transmitted modulated signals, wherein the phase difference is indicative of data compensated for borehole effects.

2. The method of claim 1, wherein the processing includes:
   demodulating the at least two modulated signals received; and
   differentiating at least one component of the demodulated signals to determine the phase difference of the transmitted modulated signals.

3. The method of claim 1, wherein the modulated signals are one of pulse-amplitude modulated signals, code division modulated signals, quadrature amplitude modulated signals, and phase-shift keyed modulated signals.

4. The method of claim 1, wherein the at least two modulated signals are one of single sideband modulated signals, double sideband modulated signals, and suppressed carrier modulated signals.

5. The method of claim 1, wherein each modulated signal comprises a single sideband suppressed carrier modulation signal.

6. The method of claim 1, wherein receiving each of the at least two modulated signals occurs substantially simultaneously.

7. The method of claim 1, wherein transmitting each of the at least two modulated signals occurs substantially simultaneously.

8. The method of claim 1, wherein transmitting each of the at least two modulated signals occurs substantially simultaneously and receiving each of the at least two modulated signals occurs substantially simultaneously.

9. The method of claim 1, wherein the processing includes filtering the at least two modulated signals received to generate an in-phase signal and a quadrature signal.

10. A method of compensating for the effect of borehole variations, comprising:
    transmitting at least two modulated signals from within the borehole;
    receiving from within the borehole the at least two modulated signals; and
    processing the at least two modulated signals received to determine an amplitude attenuation of the transmitted modulated signals, wherein the amplitude attenuation is indicative of data compensated for borehole effects.

11. The method of claim 10, wherein the processing includes:
    demodulating the at least two modulated signals received; and
    differentiating at least one component of the demodulated signals to determine the phase difference of the transmitted modulated signals.

12. The method of claim 10, wherein the modulated signals are one of pulse-amplitude modulated signals, code division modulated signals, quadrature amplitude modulated signals, and phase-shift keyed modulated signals.

13. The method of claim 10, wherein the at least two modulated signals are one of single sideband modulated signals, double sideband modulated signals, and suppressed carrier modulated signals.

14. The method of claim 10, wherein each modulated signal comprises a single sideband suppressed carrier modulation signal.

15. The method of claim 10, wherein receiving each of the at least two modulated signals occurs substantially simultaneously.

16. The method of claim 10, wherein transmitting each of the at least two modulated signals occurs substantially simultaneously.

17. The method of claim 10, wherein transmitting each of the at least two modulated signals occurs substantially simultaneously and receiving each of the at least two modulated signals occurs substantially simultaneously.

18. An apparatus for compensating for the effect of borehole variations, comprising:
    one or more transmitters configured to transmit at least two modulated signals simultaneously;
    one or more receivers configured to receive the at least two modulated signals;
    a demodulation circuit to demodulate the one or more modulated signals received; and
    a processing circuit configured to differentiate a component signal from the at least two modulated signals which have been demodulated, wherein the component signal is representative of data compensated for borehole effects.

19. The apparatus of claim 18, wherein the component signal is a phase difference of the at least two modulated signals.

20. The apparatus of claim 18, wherein the component signal is an amplitude attenuation of the at least two modulated signals.

* * * * *